R. ZERTUCHE.
DRIVING MEANS FOR HAND CARS AND OTHER MOTORS OR VEHICLES.
APPLICATION FILED APR. 15, 1914.
1,111,205.
Patented Sept. 22, 1914.
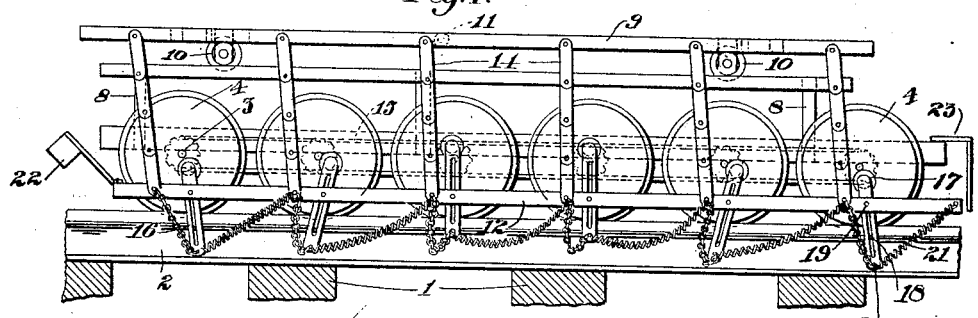
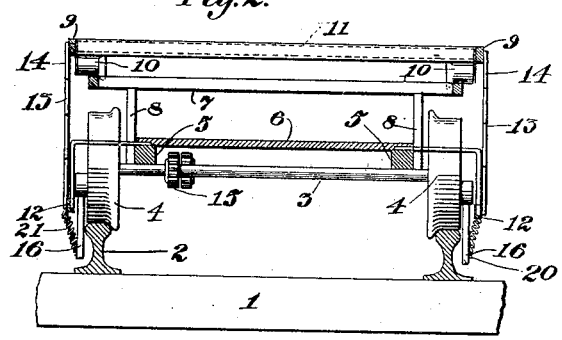
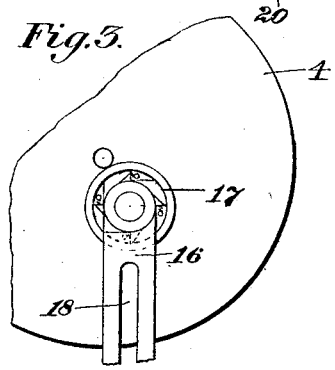
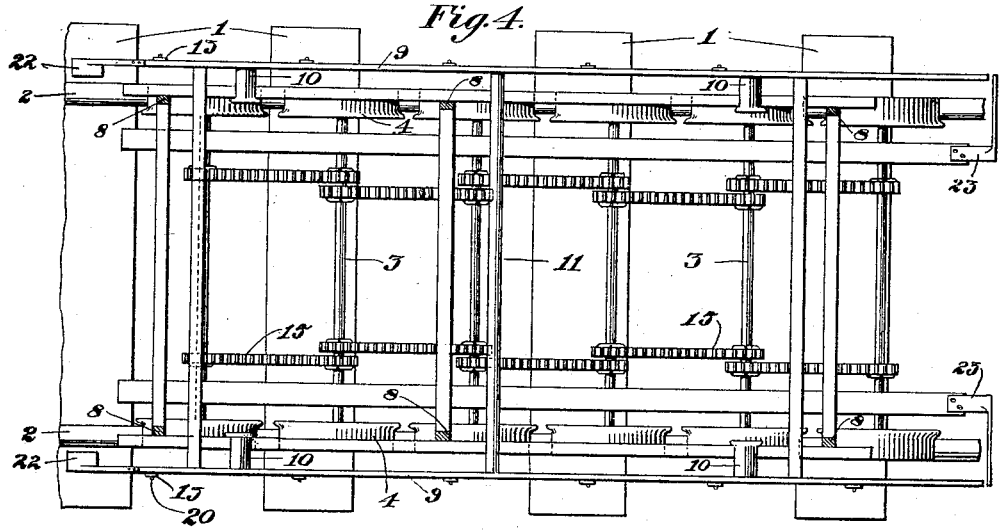
Attest:
E. M. Hamilton
H. L. Alden
Inventor:
Ruben Zertuche
by Spear, Middleton, Donaldson & Spear
Attys.

UNITED STATES PATENT OFFICE.

RUBEN ZERTUCHE, OF SALTILLO, MEXICO.

DRIVING MEANS FOR HAND-CARS AND OTHER MOTORS OR VEHICLES.

1,111,205. Specification of Letters Patent. Patented Sept. 22, 1914.

Application filed April 15, 1914. Serial No. 832,061.

*To all whom it may concern:*

Be it known that I, RUBEN ZERTUCHE, a citizen of Mexico, residing at Saltillo, Mexico, have invented certain new and useful Improvements in Driving Means for Hand-Cars and other Motors or Vehicles, of which the following is a specification.

It is the object of my invention to provide a simple and effective means to propel hand cars on railways, though the invention is not limited in this respect, and the principle involved may be utilized in the driving of any motor to which it may be adapted or to propel any vehicle.

The invention includes a series of wheels each of which is given movement in succession until the cycle of movement has been made complete, when the first and last wheels of the series are again moved and thus the movement continued through the series, this movement being imparted to the driving wheels through a series of short impulses requiring the minimum amount of force and securing maximum power as applied to the driving wheels.

I have shown in the accompanying drawing a simple application of the invention in the form of a hand car for railways, but this, it will be understood, is only representative, and the details of construction can be changed according to the application without departing from the spirit of the invention, this consisting in a series of wheels supporting the part or instrumentality to be moved with means for imparting through short successive impulses a rotative movement to each of the wheels in succession, the sum of the successive movements constituting the complete rotation of the wheel, the rotation of each wheel being communicated to the other wheels of the series. Preferably, the driving means I provide identically for each side of the device, though in some instances I may locate the driving means centrally of the vehicle, and have but a single set instead of two, as disclosed.

In the drawings Figure 1 is a side elevation of a hand car with my invention applied thereto; Fig. 2 is an end view of the same partly in section; Fig. 3 is a detail; and Fig. 4 is a plan view with the platform removed.

The invention is shown as applied to an ordinary railway, the ties 1 and rails 2 being of the usual construction. The truck consists of axles 3 and wheels 4. A framework 5 is supported on the axles and includes a platform 6 extending between the side frames 5, and also includes an upper frame 7 supported by short vertical sections 8. A frame 9 is supported upon the frame 7 through rollers 10, the frame 9 having longitudinal movement of the main frame. A hand bar 11 extends between the side members of the frame 9 for a purpose hereinafter described. On each side of the car outside of the line of the wheels is a longitudinally extending bar 12, and this bar is supported from the side frames 9 by links 13 made up of a series of pivoted sections 14, so as to provide flexibility.

As shown in Fig. 4, the axles of the wheels are connected by chains 15 so that the movement of any pair of wheels is communicated to the other wheels of the series. This is an ordinary construction. Each wheel is provided with a depending lever 16 which has an ordinary clutch connection 17 with the wheel, this clutch connection being slightly eccentric to the center of each wheel, and in the series of wheels the location of the connection is just one step removed from its adjacent lever for a purpose hereinafter described. The lever is slotted, as at 18, and through this slot passes a pin 19 on the bar 12, forming an operating connection between the bar and the lever 16. A chain or like connection 20 extends between the end of the lever 16 to which it is secured and the bar 12, as shown, so that when the upper frame 9 through the hand bar 11 is drawn by the operator toward the rear, the links 14 are drawn with the frame inclining toward the rear, and this rearward motion is imparted to the bars 12 with the result that through the pin 19 and the chain 20 the first and last levers 16 are drawn rearwardly, imparting a rotating movement to the first and last wheels of the series. This not only gives movement to these wheels, but through the chain connection moves the adjacent wheels so as to bring their levers 16 into the position first assumed by the lever of the first and last wheels, and in the next rearward movement of the frame 9 power is applied to the adjacent wheels through a like short impulse to move it, and so on throughout the series until the full cycle is complete, after which the action begins again, and so on. The bar 12 is returned after each rearward movement by the springs 21. The levers 16, by reason of their clutch connection, simply operate in one direction to move the wheels, and swing back freely in the opposite direction. A weight 22 normally tends to assist the springs 21 to keep the bars 12 pressed forward, and aids in the reciprocation of the bar. A stop 23 limits the forward movement of the bar. It will thus be seen that a very effective action is secured by a very simple construction, and the maximum of power derived with the minimum of force expended by applying the power in a series of successive impulses to the several wheels of the series in succession.

As has been stated, I do not limit myself in the application of the invention to a hand car, as a locomotive may be driven in like manner, and any suitable motor means may be utilized for imparting the movement to the frame 9 in lieu of the man power utilized in a hand car.

In case the invention is applied to a boat or any water vehicle, proper propelling means would, of course, be attached to the driving wheels to furnish the propulsion force in the water.

I claim as my invention:

1. A motor device comprising a series of wheels, a lever for each wheel having a clutch connection therewith, a longitudinal connection for the levers of the series, means for imparting longitudinal movement to said connecting means so as to give movement in succession to each of the levers, and means between the wheels of the series for imparting the movement of one wheel to the other wheels of the series, substantially as described.

2. A motor device comprising a series of wheels, a truck or the like supported therefrom, a lever for each wheel having a clutch connection therewith, a single instrumentality connecting the levers, each lever being located on its respective wheel a step removed from that of its neighbor whereby each lever comes into position in succession for operation, and means for oscillating the instrumentality connecting the levers, substantially as described.

3. In a motor device, a series of wheels, a lever for each wheel having a clutch connection, each lever being located differently upon its respective wheel so that as a whole a cycle of movement is made, a bar connecting the levers, means for oscillating the bar comprising a longitudinally movable frame, and links connecting the frame and the bar.

4. A motor device comprising a series of wheels each having a lever with a clutch connection therewith, a platform supported by said wheels, a longitudinally moving frame, rollers supporting the frame, a longitudinally extending bar connecting the wheel levers, links between the frame and bar, springs between the bar and levers, and chain connections between the levers and bar with driving connections between the axles of the several wheels, substantially as described.

In testimony whereof, I affix my signature in presence of two witnesses.

RUBEN ZERTUCHE.

Witnesses:
JOSE GARZAZ,
WALTER DONALDSON.